United States Patent
Katz et al.

(10) Patent No.: US 9,033,313 B2
(45) Date of Patent: May 19, 2015

(54) HAND OPERATED JACKS FOR LIFTING FILE CABINETS

(75) Inventors: Edward Katz, Cartersville, GA (US); David Wilkins, Dallas, GA (US)

(73) Assignee: CHO Enterprises, LLC, Marietta, GA (US)

( * ) Notice: Subject to any disclaimer, the term of this patent is extended or adjusted under 35 U.S.C. 154(b) by 907 days.

(21) Appl. No.: 13/014,407

(22) Filed: Jan. 26, 2011

(65) Prior Publication Data
US 2011/0180772 A1    Jul. 28, 2011

Related U.S. Application Data

(60) Provisional application No. 61/298,262, filed on Jan. 26, 2010.

(51) Int. Cl.
*B66F 3/24* (2006.01)
*B66F 5/04* (2006.01)
*B62B 3/06* (2006.01)
*B66F 9/06* (2006.01)

(52) U.S. Cl.
CPC ........... *B66F 5/04* (2013.01); *B62B 3/0606* (2013.01); *B62B 3/0618* (2013.01); *B62B 2202/30* (2013.01); *B62B 2301/12* (2013.01); *B66F 9/06* (2013.01)

(58) Field of Classification Search
CPC ............... B62B 3/00; B66F 9/00; B66F 5/00
USPC ... 269/17; 254/2 C, 9 C, 10 C, 8 B, 4 R, 134, 254/93 H
See application file for complete search history.

(56) References Cited

U.S. PATENT DOCUMENTS 3,582,043 A * 6/1971 Tranchero ............... 254/2 R
4,932,639 A * 6/1990 Fjellstrom ............... 269/17

* cited by examiner

*Primary Examiner* — Lee D Wilson
*Assistant Examiner* — Seahee Yoon
(74) *Attorney, Agent, or Firm* — Next IP Law Group LLP

(57) ABSTRACT

This invention discloses mechanical and hydraulic jacks for lifting heavy fireproof and burglary proof file cabinets with their contents inside for transportation to a truck or other destination. This jack can also lift lateral or regular file cabinets with their contents inside for transportation. It discloses a hook assembly which can be extended over the top of the cabinet remote from the jack with a hook to hold the cabinet from tilting. It discloses a lifting assembly with a lifting plate at the front bottom of the jack for inserting under the bottom corners of the cabinet for lifting. A device for tilting the cabinet away from the jack is disclosed to allow the lifting plate to be inserted under the cabinet. A lifting plate on the front bottom of the jack can be extended under the end of a file cabinet which is secured by the hooking assembly.

9 Claims, 6 Drawing Sheets

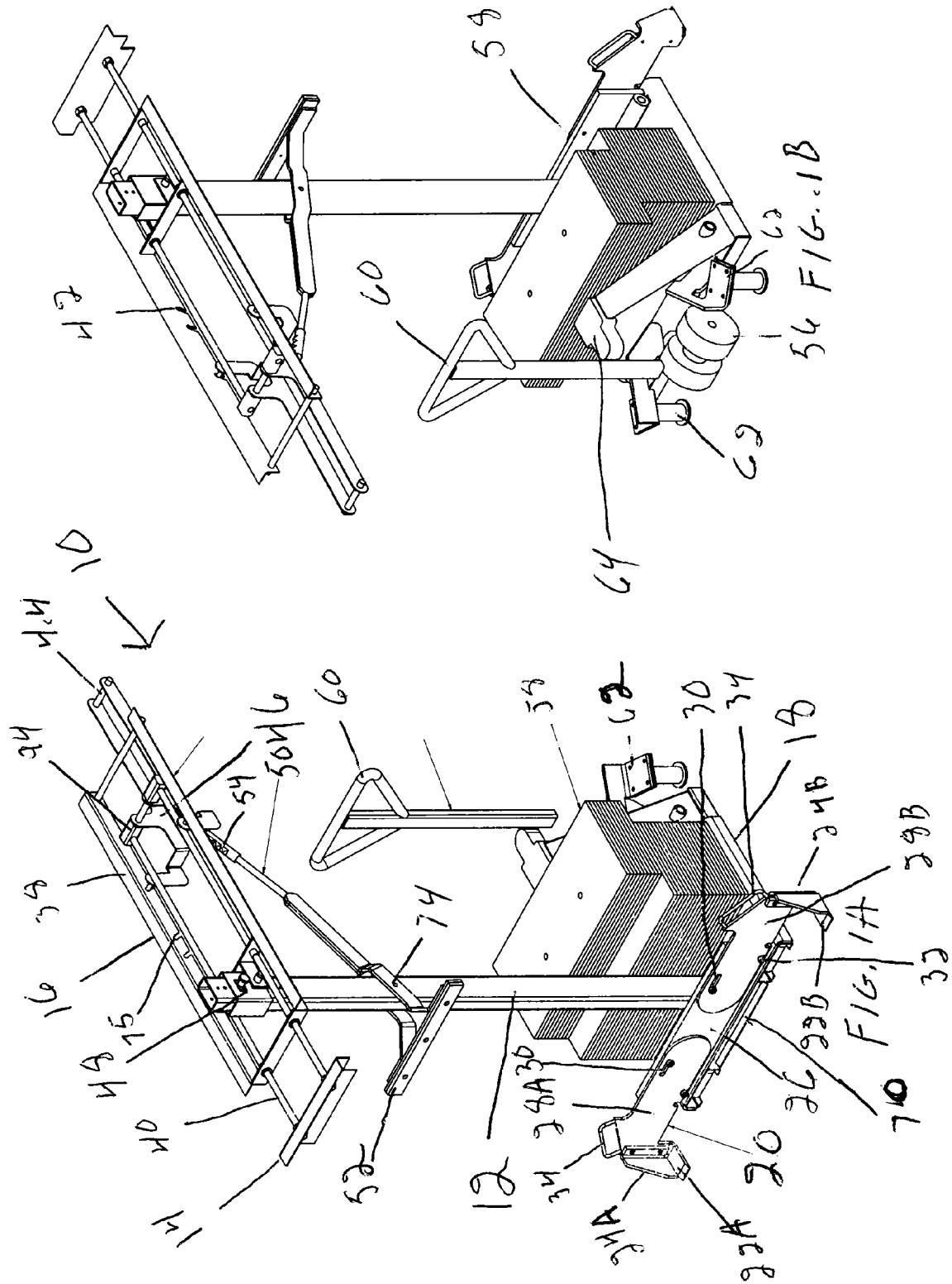

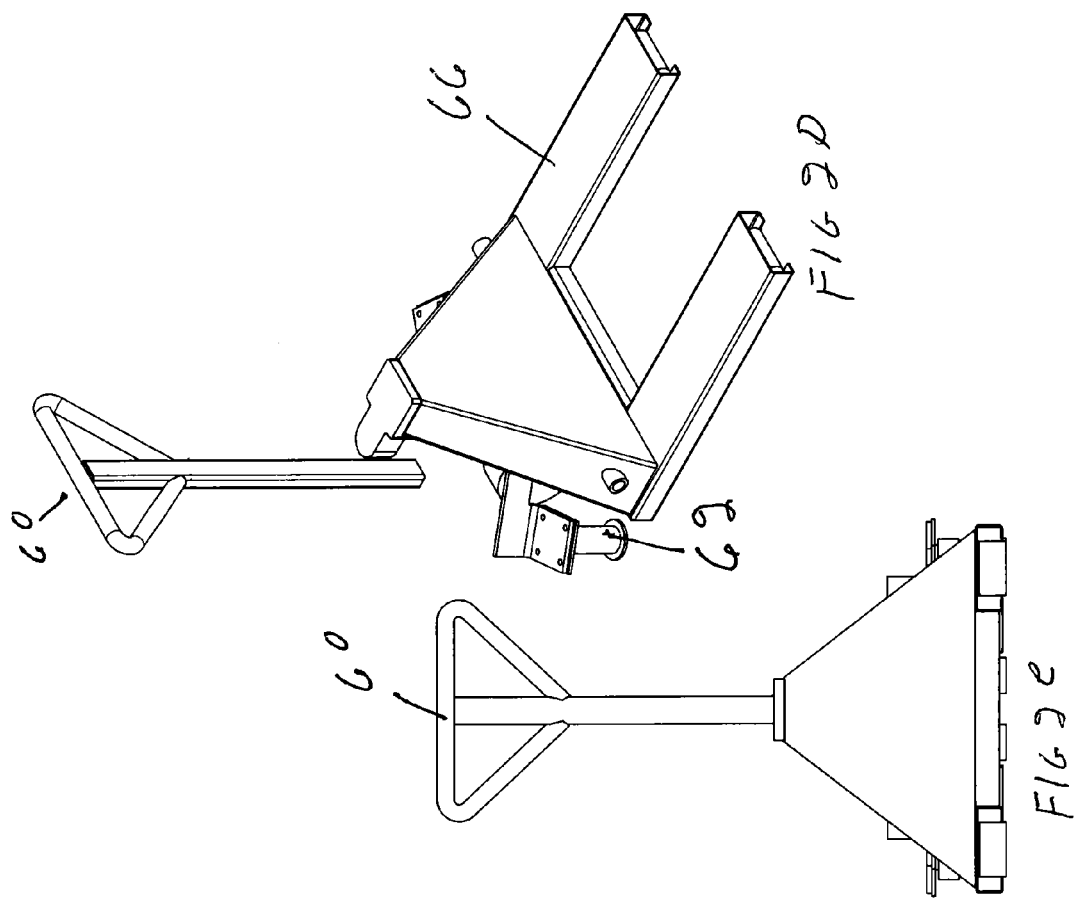
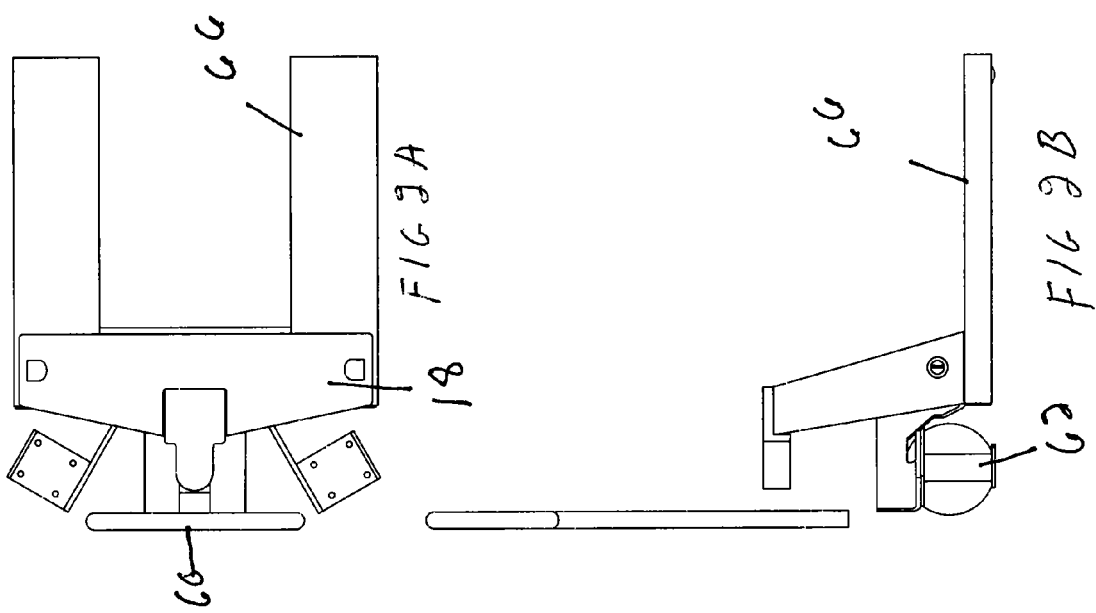

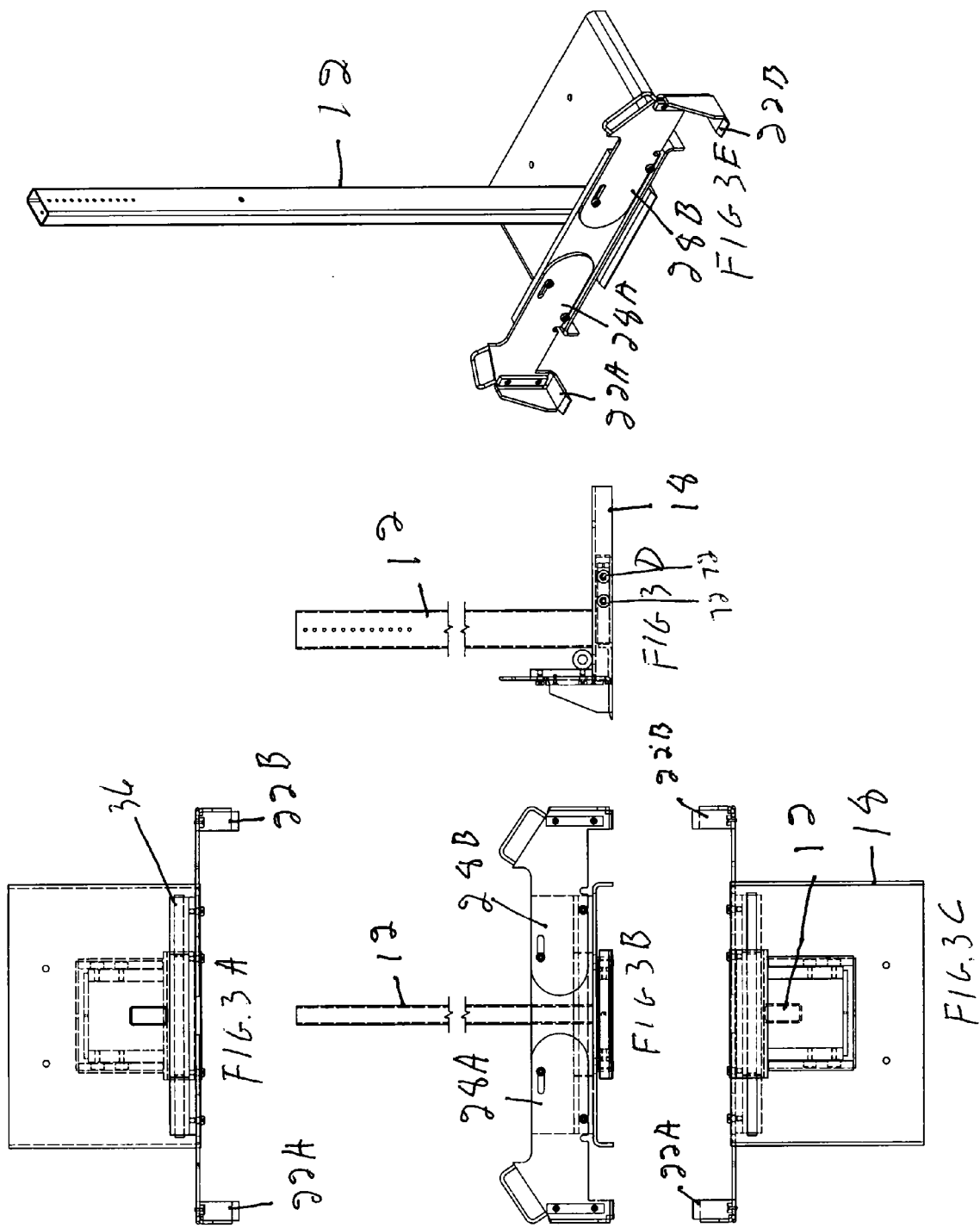

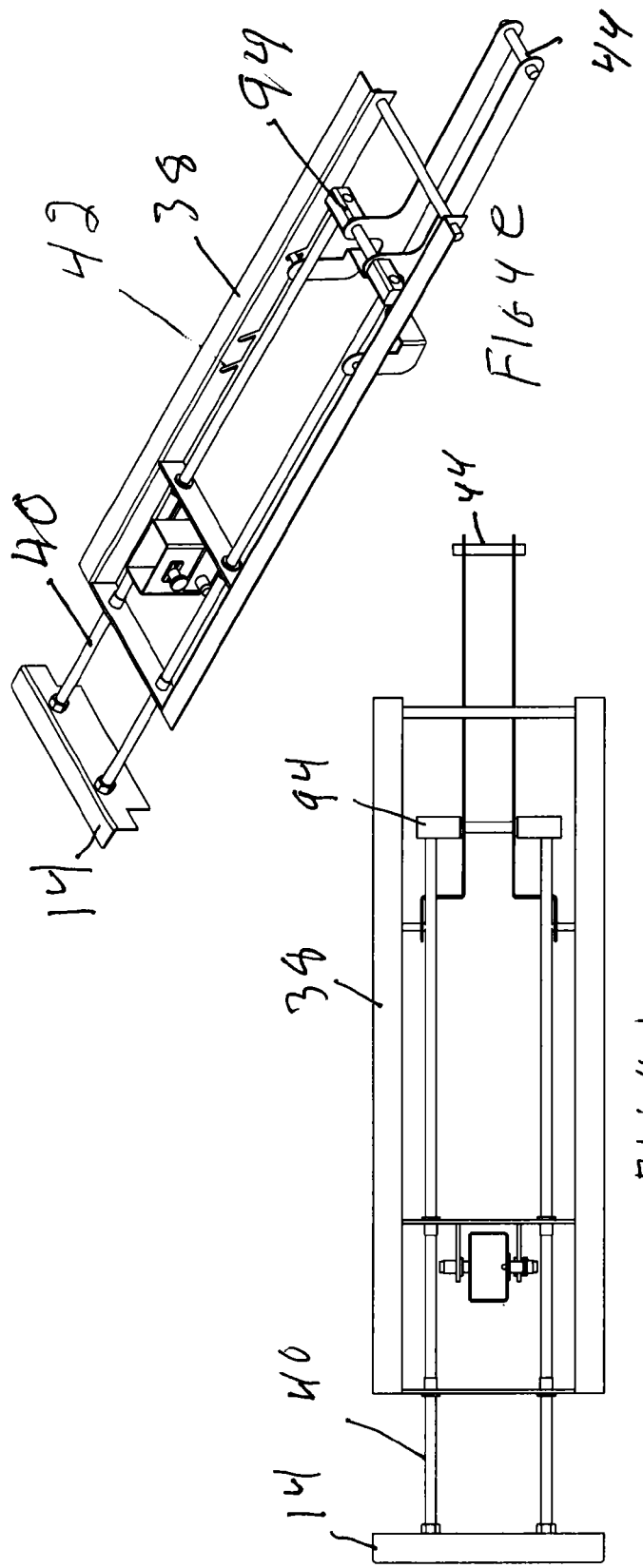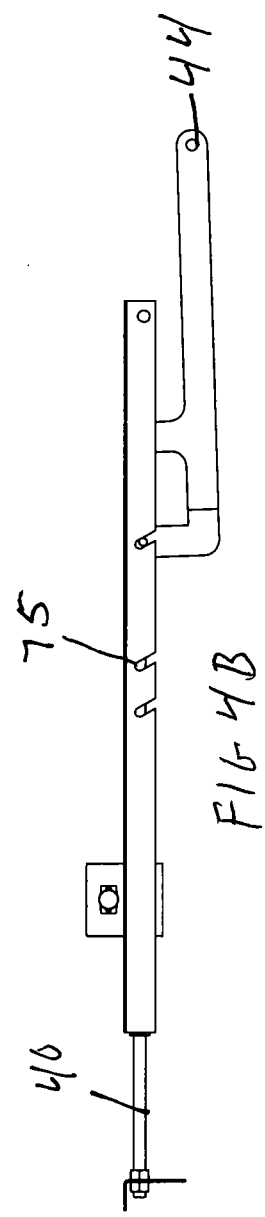

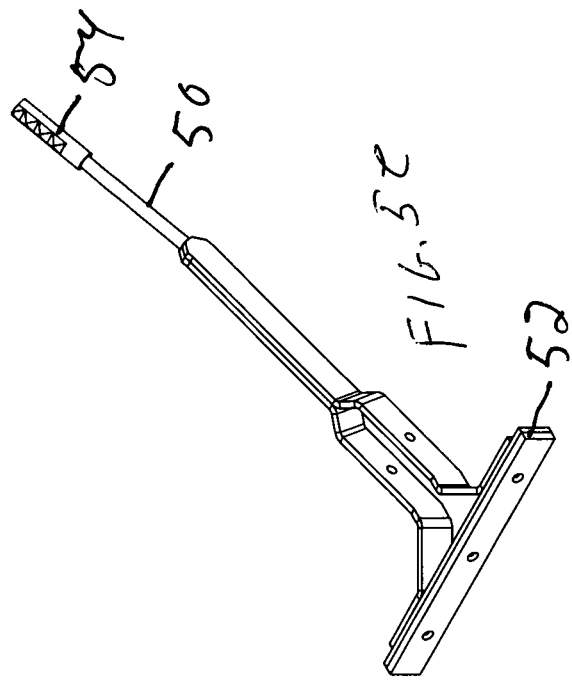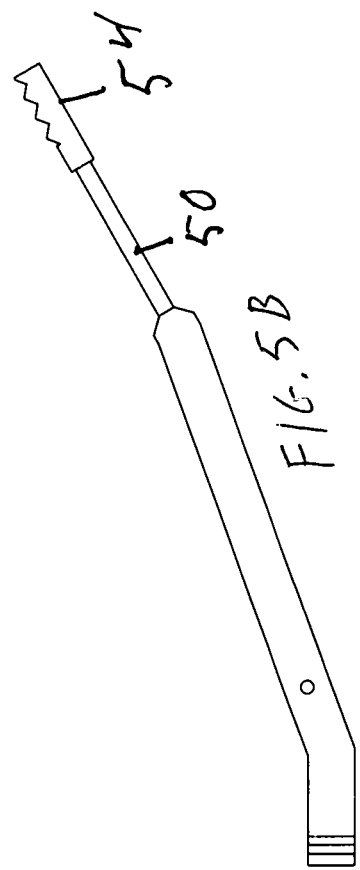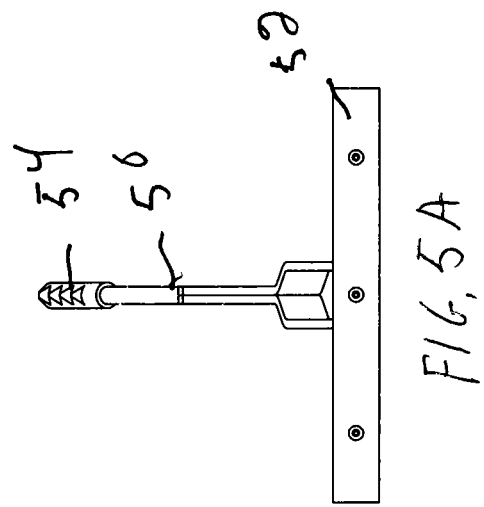

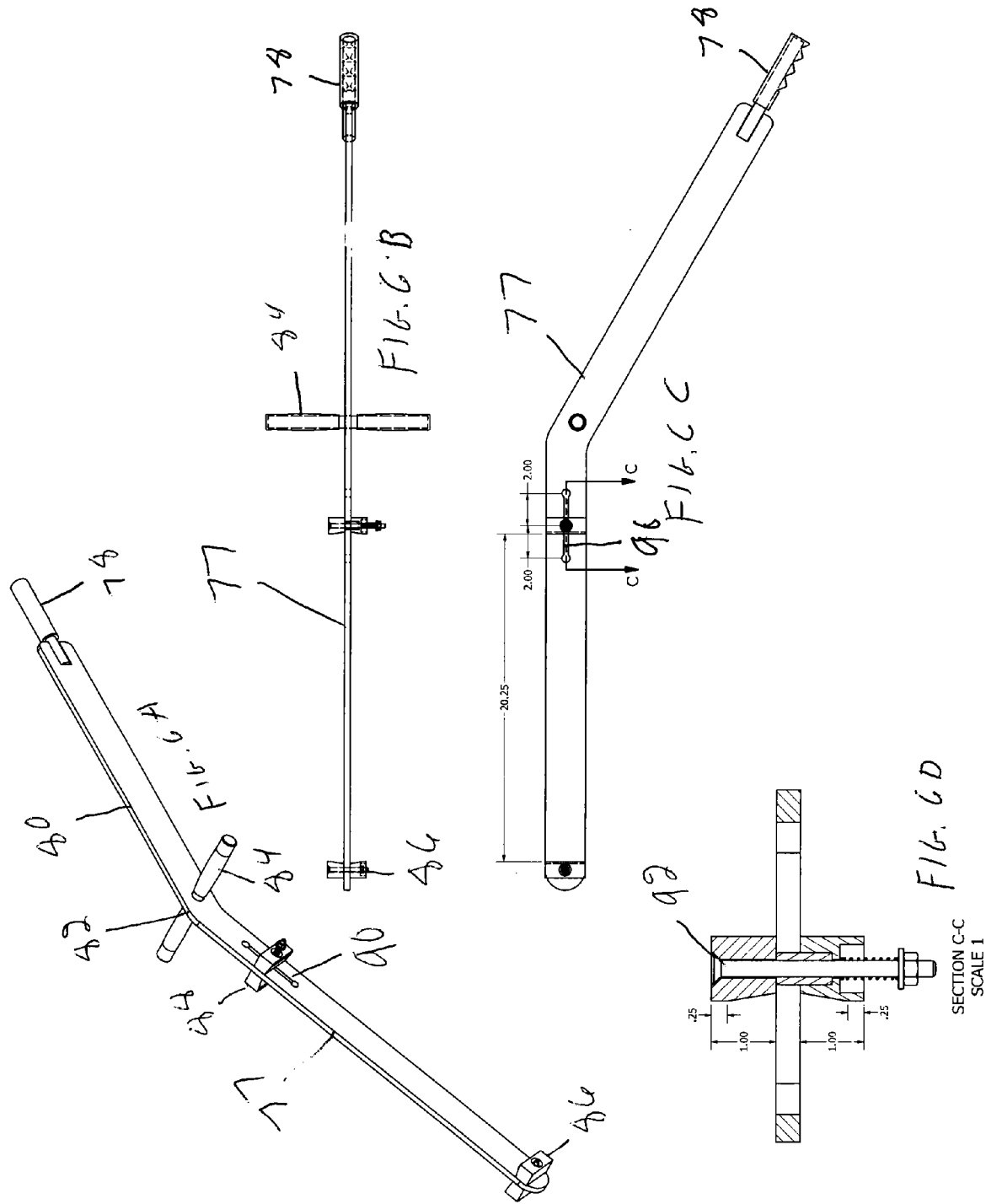

HAND OPERATED JACKS FOR LIFTING FILE CABINETS

This application is a utility application that claims priority to U.S. Provisional Patent Application entitled, "Electric and Mechanical Jacks for Lifting File Cabinets and Dollies", having Ser. No. 61/298,262, filed Jan. 26, 2010, which is entirely incorporated herein by reference.

FIELD OF THE INVENTION

The present invention relates to hydraulic and mechanical jacks for lifting heavy file cabinets, such as those that are fire proof and have a combination lock. The present invention also includes hydraulic and mechanical jacks for lifting lateral file cabinets and regular file cabinets. These jacks will transport heavy file cabinets with the contents remaining in the cabinet during transport.

BACKGROUND OF THE INVENTION

Some firms and the government have very heavy file cabinets that are heavy because they are fireproof and burglary proof in construction with heavy complicated combination locks that resist forced entry. These file cabinets typically have the lock on the cabinet. It is very difficult for movers to move these heavy file cabinets. Employers have a concern about employees getting hurt in trying to move these heavy cabinets. It is easy for the file cabinet to fall off of a dolly. It frequently requires several men to lift this file cabinet onto a dolly as the fireproof and burglary proof file cabinet may weigh from 500-1400 lbs. While these file cabinets could be empty and be moved more easily, this is not desirable because of the lack of security of the records during transit. The records would be exposed to burglary and fire.

Lateral file cabinets are very difficult to move with the contents inside. These cabinets may weigh from 500-1000 lbs. or more when filled with their contents. It is very difficult for men to place these file cabinets on the dolly for transport from the office to the truck and back again from the truck to another office.

Standard file cabinets with the drawers in front are also often very heavy to move with their contents inside.

BRIEF DESCRIPTION OF THE DRAWINGS

FIG. 1A is a perspective front view of the hydraulic jack of this invention for lifting heavy file cabinets.

FIG. 1B is a perspective back view of the hydraulic jack of this invention for lifting heavy file cabinets.

FIG. 2A is a top plan view of the frame of the hydraulic jack of this invention.

FIG. 2B is a side view of the frame of the hydraulic jack of this invention.

FIG. 2C is front view of the frame of the hydraulic jack of this invention.

FIG. 2D is a perspective view from the front side of the frame of the jack of this invention.

FIG. 3A is a top plan view of a portion of the front of the frame of the jack of this invention.

FIG. 3B is a front view of the lifting assembly of this the jack of this invention.

FIG. 3C is a bottom view of the front of the jack of this invention.

FIG. 3D is a side view of the frame showing the wheels and post of the jack of this invention.

FIG. 3E is a front perspective view of a portion of jack of this invention showing the lifting assembly and the post.

FIG. 4A is a plan view of the cabinet hook assembly of the jack of this invention.

FIG. 4B is a side view of the cabinet hook assembly of the jack of this invention.

FIG. 4C is a perspective top view of the cabinet hook assembly of the jack of this invention.

FIG. 5 A is a pusher for tilting a standard file cabinet forward for the insertion of a lifting plate under the cabinet for lifting the cabinet.

FIG. 5B is a side view of the pusher of FIG. 5A

FIG. 5C is a perspective view of the pusher of FIG. 5A

FIG. 6 A is an isometric view of the lever assembly for tilting a file cabinet, such as a lateral file cabinet.

FIG. 6B is a top view of the lever assembly of FIG. 6A

FIG. 6C is a side view of the lever assembly of FIG. 6A

FIG. 6D is cross-section of FIG. 6C

A hand operated hydraulic jack has been developed for lifting heavy file cabinets. These file cabinets are heavy because they are fireproof and have reinforcement to prevent unauthorized entry. They frequently have a lock like a safe would have. In fact, they are a type of safe. It is preferable to transport these file cabinets with the contents inside to prevent loss to fire or theft. Consequently, they are very heavy.

This hydraulic jack can be used to move lateral file or regular file cabinets with their contents inside. The ability to do this saves time and money and avoids the contents of the file cabinet being lost during moving.

In place of using hydraulics to operating the jack, it can be equipped with a mechanical device such as a ratchet, or screw which can be used to lift the cabinet, which will be discussed infra.

The hydraulic jack for lifting file cabinets is shown in FIGS. 1A through 5C. The parts list for this hydraulic jack is set forth below.

PARTS LIST

10. Hydraulic jack for lifting heavy file cabinets
12. Vertical post for holding hook assembly
14. Hook plate for holding top of cabinet
16. Hook assembly
18. Frame of hydraulic jack
20. Lifting assembly for lifting corners of lateral type file cabinet
22. A & B Lifting plates
24. A & B Side guards for lifting plates
26. Support plate for lifting assembly
28 A & B. Adjustable plates for supporting lifting plates 22A & B
30. Slots and studs for adjusting the width of the lifting assembly
32. Studs for hold adjustable plates 28 A & B in position
34. Handles for moving the lifting assembly out of the way
36. Rotating rod in a tube for rotating lifting assembly backwards
38. Frame for hook assembly
40. Rods for holding and moving hook plate 14
42. Notches in the frame of the hook assembly for adjusting the length of the rods for the hook plates
44. Lever for locking and unlocking the hook plate from the cabinet
46. Cam actuator to lock and unlock the hook plate to the cabinet
48. Adjustable sleeve to support the hook assembly to the vertical post 50. Pusher for tilting a standard file cabinet forward
52. Pusher plate
54. Handle for pusher
56. Steerable rollers for hydraulic jack
58. Ballast for counterbalancing weight of cabinet
60. Handle and connected tube for steering and controlling hydraulic pressure of jack.
62. Adjustable floor posts
64. Support and housing for hydraulic pump and accessories and hydraulic lines
66. Lifting blades for hydraulic jacks.
70. Lifting plate for lifting standard file cabinet
72. Liftable wheels for supporting hydraulic jack.
74. Bolt
75. Stud
77. Tilting lever
78. Handle
80. Flat bar
82. Bend
84. Hand grip
86. Fixed block
88. Adjustable block
90. Longitudinal slot
92. Spring loaded adjustment bolt for adjustable block
94. Movable hooker rod and plate mechanism As shown in FIG. 1A this hydraulic jack 10 has a strong frame 18 for holding a heavy file cabinet, such as heavy fireproof and burglary proof cabinets with their contents inside. It can also be used to lift lateral file cabinets and regular file cabinets with their contents inside. This hydraulic jack 10 has a vertical post 12 for holding a hook assembly 16 which is used to place and lock a hook plate 14 for holding the top of the cabinet securely on the hydraulic jack 10. The heavy fireproof and burglary proof cabinets and lateral file cabinets have bottom corners which are supported by lifting plates 22A & B during the lifting and carrying of the file cabinet (not shown).

The hydraulic jack has a frame 18 which is supported by steerable rollers 56 and additional wheels 72 at various places along the lifting blades 66 as shown in FIG. 3D. The hydraulic jack is controlled by a tube lever with a handle 60 which controls the direction of the rollers 56. This handle also serves the purpose of manually pumping the hydraulic pump (not shown) by moving the handle up and down to increase the pressure in hydraulic lines. The hydraulic pump is located in the support and housing 64 for the pump, hydraulic lines, hydraulic actuators and controls for the hydraulic system. The pump 60 basically raises the lifting blades 66 through an actuator (not shown) in the housing and through a mechanical linkage which lower the wheels 72 attached to the bottom of lifting blades 66 which raises the lifting blades. The raising of the lifting blades 66 is normally done when a cabinet has been loaded onto the hydraulic jack. The lifting blades 68 can be lowered by a control on the handle 60 or elsewhere.

This hydraulic jack 10 is best understood by describing how it lifts and moves a file cabinet and lets it down on the floor. The jack is moved by pushing on handle 60 and steering the rollers 56 to place the jack near a file cabinet. In the case of a heavy safe type cabinet or lateral file cabinet the jack is moved to the long side of the cabinet for lifting. This type of cabinet is lifted by a lifting assembly 20 for lifting the bottom corners of the cabinet which are adjacent the lifting assembly. These bottom corners are lifted by lifting plates 22A & B. Because the lateral file type cabinets have different lengths, it is necessary to have some way of adjusting the distance between lifting plates 22A & B. This is accomplished by vertical adjustable plates 28 A & B which support the lifting plates 22A & B. The adjustable plates are attached by slots and studs 30 which extend through horizontal slots in the adjustable plates 28 A & B and fasten to vertical support plate 26 for the lifting assembly 20. Studs 32 which extend through vertical slots in the adjustable plates 28A & B help hold the adjustable plates in position. The adjustable plates 28A & B with the attached lifting plates 22A & B can be moved horizontally by handle 34 on either side of the lifting assembly 20 so that the lifting plates 22A & B will fit snugly under the front corners of the file cabinet. These lifting plates 22A & B may have side guards 24A & B to help prevent the cabinet sliding off of the lifting plates. A lateral file cabinet is usually either 36" or 42" wide and 18" to 20" deep from front to rear. The adjustable plates 28A & B can be moved horizontally through that range or greater if needed. The slots 30 with the studs can be extended horizontally to accept bigger cabinets.

Since the lateral file cabinet is resting on a floor, the lifting plates 22A & B can not usually be slid under the bottom front corners of the cabinet (next to the lifting assembly 20). It is necessary to tilt the cabinet slightly forward away from the hydraulic jack so the lifting plates 22A & B will slide under the cabinet. With a lateral file cabinet this is accomplished by tilting lever 77 which is shown in FIGS. 6A-D. An operator places this lever 77 which is basically a flat bar 80 immediately adjacent a side (short dimension) of the lateral file cabinet. The fixed block 86 closest to the side of cabinet is placed along a short portion of the length of the cabinet farthest from the jack and is placed at the corner of the cabinet, preferably below the midpoint of the height of the cabinet to prevent the cabinet from moving forward. To maximize leverage, the adjustable block 88 is placed along a portion of the length of the cabinet at a corner near the top of the cabinet which is nearest the lifting assembly 20. The adjustable block 88 can be adjusted to fit snugly against the corner of the cabinet where it is placed. The adjustable block 88 can be adjusted by being moved along longitudinal slot 90 to the proper snug position and locked in position by a spring loaded adjustment bolt 92. The operator can tilt the length of the cabinet adjacent the lifting assembly by raising the handle 78. The hydraulic jack can then be moved forward until the lifting plates 22A & B have been slid under the corners of the cabinet. The tilting lever 77 can then be lowered and removed from the cabinet. The tilting lever is designed so it can be placed on either side of the cabinet. In the case of very heavy cabinets, a tilting lever can be used on both sides of the cabinet by two operators.

It is now necessary to use the hook assembly 16 to secure the cabinet on the lifting assembly 20 to prevent the top of the cabinet from tilting. To prevent the jack from moving in this process, the jack may have several adjustable and locking floor posts 62 to prevent the jack from moving, which may not be necessary for moving lateral file cabinets. The hook plate 14 can be extended over the top of the cabinet and extended a short distance down the length of the cabinet farthest from the lifting assembly 20 to hold the cabinet in a secure position on the hydraulic jack. In order to place the hook plate 14 for holding the top of the cabinet from falling forward, rods 40 for holding and moving the hook plate 14 must be in the proper position relative to the cabinet. Notches 42 in the frame 38 of the hook assembly 16 allow for the proper adjustment of the length of the movable hook rod and plate mechanism 94. This mechanism 94 can be moved down and forward or backwards to the proper position and raised so that the proper stud 75 fits in the proper notch 42. The rods 40 can be moved to the proper position so that the hook plate 14 fits loosely along a portion of the top center of the length of the cabinet. Once the hook plate 14 has been extended over the top of the cabinet, lever 44 for locking and unlocking the hook place from the cabinet can be pushed up which moves the cam actuator 46 which locks the cabinet in position for transporting. The lever 44 can be pulled down to unlock the hook plate 14 from the cabinet once it has been moved to the proper location.

A control (not shown) is provided on the handle 60 or elsewhere to release the hydraulic pressure so the lifting blades will fall to their normal position. The hydraulic jack can be moved back from the cabinet which will pull the lifting plates 22A & B from under the cabinet.

In order to prevent the cabinet from being tilted forward too far by lever 77, the hook plate 14 can be placed loosely over the front of the cabinet to prevent the cabinet from falling forward. The plate 14 can then be tightened after lifting plates 22A & B have been inserted under the cabinet.

The lifting assembly 20 is too wide to go through many doorways and needs to be placed out of the way. This is accomplished by folding the adjustable plates 28A & B upwards towards each other so they are vertical. This is permitted by the horizontal slots and studs 30. As the studs 32 are in slots that extend to the bottom of adjustable plate 28, the studs do not interfere with swinging adjustable plates 28A & B into a vertical position. These plates and support plate 26 can then be folded backwards to rest on the ballast 58. The support plate 26 is attached to rotating rod 36 as shown in FIG. 3A which freely permits the support plate 26 and adjustable plates 28A & B to be rotated backwards and forward. It is also preferable to place the lifting assembly 20 in its backwards position for moving normal filing cabinets.

This hydraulic jack can be used for moving standard filing cabinets. As mentioned above the lifting assembly 20 is normally moved backwards out of the way back onto the jack for moving a standard filing cabinet. The jack is normally moved towards the front of the cabinet where the drawer handles are located. When the front of the jack is close to the cabinet, the adjustable floor posts 62 are preferably lowered and locked to hold the jack stationary. The standard filing cabinet is tilted backwards away from the front of the jack.

This is accomplished by the operator using a pusher 50, which has a pusher plate 52 at its forward end and is fastened on the vertical post 12 by a bolt 74 to hold it in proper position. The cushioned pusher plate 52 will normally push against the front of cabinet near the top where it has the most leverage for tilting the cabinet forward. The pusher 50 has a handle 54 for the operator to direct the pusher plate towards the proper position on the cabinet. Once the front of the cabinet has been raised, a lifting plate 70 on the front of the jack can be inserted under the base of the cabinet by a lever, hydraulic actuator, or motor (not shown). This lifting plate can have wheels (not shown) to help stabilize the lifting plate as it is inserted under the cabinet and supporting the cabinet so the lifting plate does not drag on the floor. The lifting plate 70 for the jack can be lifted as discussed supra. The fixed location of the pusher plate 52 rests against the cabinet to prevent it from falling or tilting against the jack. It is also located so it pushes the cabinet forward only a sufficient distance to insert the lifting plate 70 under the cabinet. The floor posts 62 prevent the cabinet from being pushed to far forward. The hook plate 14 can be extended over the top of the cabinet and extended to the back of the cabinet to hold the cabinet in a secure position on the hydraulic jack. As a precaution in lifting the standard cabinet the hook plate 14 can be extended loosely over the back of the cabinet to prevent it from falling during the tilting operation.

The hydraulic jack of this invention lifts both the lateral and standard file cabinets clear of the floor for moving.

A mechanical jack can be constructed with the same features as the hydraulic jack but without the hydraulics for raising the lifting blades 66. These blades can be raised by mechanical leverage, such as a ratchet or screw mechanism or other type of mechanical leverage device. The mechanical jack will operate in the same way except that a mechanical leverage mechanism is used to raise the lifting blades 66. The mechanical jack could lower the wheels by pushing the handle 60 up and down to operate a ratchet or screw mechanism or other types of devices that can lift a heavy load by increments with repeated pumping of the handle.

While the invention will be described in conjunction with illustrated embodiments, it will be understood that it is not intended to limit the invention to such embodiments. On the contrary, it is intended to cover all alternatives, modifications and equivalents as may be included within the spirit and scope of the invention as defined by the present patent specification as a whole.

We claim:

1. A manually operated jack for lifting and transporting file cabinets which have a bottom, top and four vertical sides, the jack comprising a frame to which are attached steerable wheels with a turning handle for turning the wheels to direct the direction of the jack during movement, with the jack being movable manually, with the jack having front, top and bottom sections, at least one liftable plate attached to the frame of the jack in the bottom section with the wheels, said liftable plate supporting an adjustable lifting assembly with at least one lifting plate on the front bottom section of the jack for insertion under the bottom of the cabinet on the side of the cabinet nearest the front of the jack, with the jack having an extendable hook assembly with a hook plate attached at the top front section of the jack, which the extendable hook assembly is extendable over the top of the cabinet so that the hook plate is adjusted to contact and fit snuggly near the top of the cabinet on side of the cabinet farthest from the front of the jack to hold the cabinet secure during lifting and transport, said extendable hook assembly being adjustable for cabinets of different dimension and having means to tighten and loosen the extendable hook assembly from the cabinet, said jack having manual means to raise and lower the wheels supporting the liftable plate of the jack which in turn raises or lowers the lifting plates of the lifting assembly, said jack having a suitable weight to counterbalance the weight of the cabinet during lifting and transport, wherein the manual means to raise and lower the wheels is a manual handle that utilizes the leverage of the turning handle and connected tube to lower the wheels supporting the liftable plate of the jack down by small increments which in turns lifts the lifting plates of the lifting assembly.

2. The manually operated jack of claim 1 in which the manual means to raise and lower the wheels is a hydraulic pump which is manually operated by the manual handle and which has hydraulic and mechanical means to move the wheels supporting the liftable plate of the jack down which in turn lifts the lifting plates of the lifting assembly.

3. The manually operated jack for lifting and transporting file cabinets of claim 1 in which the extendable hook assembly has a frame supported by a vertical post near the top of the post located in the front section of the jack, the hook assembly having the hook plate with at least one rod or bar attached to the hook plate which can be extended over the top of a cabinet with a cam actuated lever to tighten or loosen the hook plate from the top of the cabinet, with the frame and rod or bar having multiple temporary fastening connections to lengthen or shorten the rod or bar depending upon the size of the cabinet with means to adjust the length of the rod or bar.

4. A manually operated jack for lifting and transporting file cabinets which have a bottom, top and four vertical sides, the jack comprising a frame to which are attached steerable wheels with a handle for turning the wheels to direct the direction of the jack during movement, with the jack being movable manually, with the jack having front, top and bottom sections, at least one liftable plate attached to the frame of the jack in the bottom section with the wheels, said liftable plate attached to the frame of the jack in the bottom section with the wheels, said liftable plate supporting an adjustable lifting assembly with at least one lifting plate on the front bottom section of the jack for insertion under the bottom of the cabinet on the side of the cabinet nearest the front of the jack, with the jack having an extendable hook assembly with a hook plate attached at the top front section of the jack, which extendable hook assembly is extendable over the top of the cabinet so that the hook plate is adjusted to contact and fit snuggly near the top of the cabinet on side of the cabinet farthest from the front of the jack to hold the cabinet secure during lifting and transport, said extendable hook assembly being adjustable for cabinets of different dimensions and having means to tighten and loosen the extendable hook assembly from the cabinet, said jack having a manually operated hydraulic pump with hydraulic and mechanical means which lower the wheels supporting the liftable plate of the jack which in turn raises or lowers the lifting plates of the lifting assembly, said jack having a suitable weight to counterbalance the weight of the cabinet during lifting and transport, wherein the adjustable lifting assembly has two of the lifting plates spaced apart from each other so each will fit snuggly under a corner of the cabinet, with each lifting plate attached to an adjustable plate which permits the lifting plates to move horizontally to fit snuggly under cabinets of different size.

5. The manually operated jack for lifting and transporting file cabinets of claim 4 in which the adjustable plates with the lifting plates attached can be moved vertically towards each other and rotated backwards over the ballast of the jack to be out of the way for going through doorways and performing other lifting task.

6. The manually operated jack for lifting and transporting file cabinets of claim 5 which has a vertical post to which is attached a pusher with pusher plate for tilting a cabinet slightly with the pusher manually controlled to be in the proper location for pushing the cabinet, with the jack have the lifting plate on the front of the jack with supporting wheels which can be extended under the end of a cabinet and then lifted and transported by the jack.

7. The manually operated jack for lifting and transporting file cabinets of claim 6 which had adjusted floor posts to stabilize the jack during the pushing and lifting operation.

8. The manually operated jack for lifting and transporting file cabinets of claim 4 in which the extendable hook assembly has a frame supported by a vertical post near the top of the post located in the front section of the jack, the hook assembly having the hook plate with at least one rod or bar attached to the hook plate which can be extended over the top of a cabinet, with the frame and rod or bar having multiple temporary fastening connections to lengthen or shorten the rod or bar depending upon the size of the cabinet with means to adjust the length of the rod or bar.

9. A manually operated jack for lifting and transporting file cabinets which have a bottom, top and four vertical sides, the jack comprising a frame to which are attached steerable wheels with a turning handle for turning the wheels to direct the direction of the jack during movement, with the jack being movable manually, with the jack having front, top and bottom sections, at least one liftable plate attached to the frame of the jack in the bottom section with the wheels, said liftable plate attached to the frame of the jack in the bottom section with the wheels, said liftable plate supporting an adjustable lifting assembly with at least one lifting plate on the front bottom section of the jack for insertion under the bottom of the cabinet on the side of the cabinet nearest the front of the jack, with the jack having an extendable hook assembly with a hook plate attached at the top front section of the jack, which extendable hook assembly is extendable over the top of the cabinet so that the hook plate is adjusted to contact and fit snuggly near the top of the cabinet on side of the cabinet farthest from the front of the jack to hold the cabinet secure during lifting and transport, said extendable hook assembly being adjustable for cabinets of different dimensions and having means to tighten and loosen the extendable hook assembly from the cabinet, said jack having a manually operated hydraulic pump with hydraulic and mechanical means which lower the wheels supporting the liftable plate of the jack which in turn raises or lowers the lifting plates of the lifting assembly, said jack having a suitable weight to counterbalance the weight of the cabinet during lifting and transport, a multi-purpose handle attached to a tube lever which is attached to wheels for the jack to direct the steering of these wheels and to move the jack, with the multi-purpose handle also manually operating the hydraulic pump by pushing the multi-purpose handle up and down to increase pressure in the hydraulic lines to mechanical actuators to lower the wheels supporting the liftable plate of the jack which in turn raises or lowers the lifting plate of the lifting assembly.

\* \* \* \* \*